United States Patent (12)
Armitage et al.

(10) Patent No.: US 9,688,283 B2
(45) Date of Patent: *Jun. 27, 2017

(54) ENHANCED DRIVER AND VEHICLE PERFORMANCE AND ANALYSIS

(71) Applicant: Cartasite, LLC, Denver, CO (US)

(72) Inventors: David L. Armitage, Golden, CO (US); Gregory Froim Kushnir, Denver, CO (US); Mark Alvin Mason, Thornton, CO (US)

(73) Assignee: Cartasite, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/136,727

(22) Filed: Apr. 22, 2016

(65) Prior Publication Data

US 2016/0236691 A1 Aug. 18, 2016

Related U.S. Application Data

(63) Continuation-in-part of application No. 14/188,928, filed on Feb. 25, 2014, now abandoned.

(51) Int. Cl.
B60K 23/00 (2006.01)
B60W 40/09 (2012.01)
B60K 35/00 (2006.01)
G07C 5/00 (2006.01)
G09B 19/16 (2006.01)
G07C 5/08 (2006.01)

(52) U.S. Cl.
CPC ............. *B60W 40/09* (2013.01); *B60K 35/00* (2013.01); *G07C 5/008* (2013.01); *G07C 5/0816* (2013.01); *G09B 19/167* (2013.01); *B60K 2350/1092* (2013.01); *B60W 2520/10* (2013.01); *B60W 2520/105* (2013.01); *G07C 5/085* (2013.01)

(58) Field of Classification Search
CPC ...... G07C 5/008; G07C 5/0816; G07C 5/085; G07C 5/0808; G07C 5/0891; B60K 2350/1092; B60K 35/00; B60W 2520/105; B60W 40/09; B60W 2530/14; B60W 2540/28; B60W 2550/402; G08G 1/205; G08G 1/01; G08G 1/0137; G08G 1/096716; G08G 1/096725; G08G 1/096741; G08G 1/096775; G08G 1/096791; B60Q 1/52; B60R 22/48
USPC .......................... 340/439, 436, 438, 641, 905
See application file for complete search history.

(56) References Cited

U.S. PATENT DOCUMENTS 5,394,136 A 2/1995 Lammers et al.
7,796,017 B2 9/2010 Kiribayashi
8,240,419 B2 8/2012 Zimmermann et al.
(Continued)

Primary Examiner — Fekadeselassie Girma
(74) Attorney, Agent, or Firm — Holzer Patel Drennan

(57) ABSTRACT

Methods, systems, and software are disclosed for operating a driver analysis system, including receiving vehicle operation data corresponding to operation of vehicles by drivers, identifying a peer group associated with a target driver, processing at least a portion of the vehicle operation data to determine driving performance of the target driver relative to driving performance of the peer group, generating a driving report which identifies the driving performance of the target driver, and transferring the driving report to a target device for viewing by an entity, where the driving report may exclude some information based on the location of traffic lights.

19 Claims, 8 Drawing Sheets

(56) References Cited

U.S. PATENT DOCUMENTS

| | | | |
|---|---|---|---|
| 8,604,920 B2* | 12/2013 | Armitage | B60W 40/09 340/439 |
| 9,082,308 B2* | 7/2015 | Armitage | B60W 40/09 |
| 9,315,195 B2* | 4/2016 | Armitage | B60K 35/00 |
| 2002/0015035 A1 | 2/2002 | Inaba et al. | |
| 2003/0201886 A1* | 10/2003 | Robbins | B60Q 1/52 340/471 |
| 2004/0236476 A1 | 11/2004 | Chowdhary | |
| 2005/0275515 A1* | 12/2005 | Morris | G08G 1/205 340/438 |
| 2006/0244619 A1 | 11/2006 | Nickels | |
| 2007/0001831 A1* | 1/2007 | Raz | B60R 16/0231 340/439 |
| 2007/0164853 A1 | 7/2007 | Matsuda et al. | |
| 2008/0255722 A1 | 10/2008 | McClellan et al. | |
| 2008/0319604 A1* | 12/2008 | Follmer | G07C 5/0891 701/33.4 |
| 2009/0024273 A1* | 1/2009 | Follmer | G06Q 10/10 701/33.4 |
| 2009/0088922 A1 | 4/2009 | Mesec | |
| 2009/0096624 A1* | 4/2009 | Stengel | B60R 22/48 340/641 |
| 2010/0030586 A1 | 2/2010 | Taylor et al. | |
| 2010/0144324 A1* | 6/2010 | Wright | H04M 3/42068 455/414.1 |
| 2011/0012720 A1 | 1/2011 | Hirschfeld | |
| 2011/0063099 A1 | 3/2011 | Miller et al. | |
| 2011/0090075 A1 | 4/2011 | Armitage et al. | |
| 2011/0210867 A1* | 9/2011 | Benedikt | G08G 1/01 340/905 |
| 2012/0044063 A1 | 2/2012 | McClellan et al. | |
| 2014/0099607 A1 | 4/2014 | Armitage et al. | |
| 2014/0167946 A1* | 6/2014 | Armitage | G07C 5/0816 340/439 |
| 2014/0199662 A1 | 7/2014 | Armitage et al. | |

\* cited by examiner

ENHANCED DRIVER AND VEHICLE PERFORMANCE AND ANALYSIS

RELATED APPLICATIONS

This application is related to, and is a continuation in part application of, and claims priority to, U.S. patent application Ser. No. 14/188,928 filed Feb. 25, 2014, entitled "Driver and Vehicle Analysis", which is a continuation in part of U.S. application Ser. No. 14/100,933 filed Dec. 9, 2013, entitled "Driver Performance and Consequence," which is a continuation-in-part of U.S. patent application Ser. No. 12/902,087 filed Oct. 11, 2010 entitled "Systems and Methods for Vehicle Performance Analysis and Presentation," which claims priority to U.S. Provisional Patent Application No. 61/253,333, entitled "Systems and Methods for Vehicle Performance Analysis and Presentation" filed on Oct. 20, 2009, which are all hereby incorporated by reference in their entirety.

TECHNICAL BACKGROUND

Performance monitoring tools are commonly used to assess the operation of a vehicle, such as an automobile, airplane, or the like. Such tools analyze the performance of the vehicle and the various internal systems which make up the vehicle. In addition, the monitoring systems may assess the behavior of the driver operating the vehicle and gather data information pertaining to how that person is operating the vehicle. These assessments may be achieved in both real time and non-real time manners.

Most newer cars and trucks contain On Board Diagnostics (OBD) systems which provide some level of self-diagnostic and information reporting capability. OBD systems were originally developed to be used during the manufacturing and test processes. However, the capabilities of these systems and their uses have expanded dramatically since that time. Currently, OBD systems give repair technicians, vehicle owners, and emissions testing agencies electronic access to state of health and operational information pertaining to many different vehicle subsystems. Historically, many vehicle functions like braking, speed indication, and fuel delivery were performed by mechanical systems and components. Presently, many of these vehicle functions are controlled or monitored through electronic means, thereby making electronic information about the performance and operations of those systems readily available. It is now possible to electronically monitor tens, if not hundreds, of operational characteristics of a vehicle using OBD systems, as well as power devices from the OBD port.

Driver behavior and the potential for vehicle accidents has been a longstanding concern. In recent years, driver behavior has garnered additional attention in various media outlets. In particular, some media have reported on the impact of new communication technologies, such as cell phones and text messaging, on driver behavior. It has been shown that engaging with these technologies while operating a vehicle can have significant adverse effects. Consequently, business owners and government agencies that have drivers operating vehicles on their behalf have heightened concerns about the driving behaviors of their drivers and the ensuing risks which may be associated with those behaviors. Parents may be concerned about the driving behaviors of their children and wish to affect those driving behaviors for similar reasons.

In addition to affecting the risks of an accident, driver behavior may have other important cost and environmental impacts as well. For example, rapid or frequent acceleration of a vehicle may result in less efficient fuel consumption or higher concentrations of pollutants. In addition, hard braking or excessive speed may result in increased maintenance costs, unexpected repair costs, or require premature vehicle replacement.

Another metric to monitor may be yellow traffic light intervals, in that a drive may have a rapid deceleration to avoid traveling through an intersection during a red or yellow light.

Overview

In various embodiments, systems and methods are disclosed for operating a driver analysis system to analyze driver behavior and providing a presentation of the analyzed information to a driver and a third party, such as a supervisor, etc. The analyzed information may include an indication that the driver has disabled one or more safety devices, which may include the safety belt system.

In an embodiment, a method of operating a driver analysis system receiving vehicle operation data corresponding to operation of one or more vehicles operated by one or more drivers, generating a driving report which identifies the driving performance of a target driver, and transferring the driving report to a target device for viewing by one or more entities, where the vehicle operation data comprises an indication of status of a safety system of at least one of the one or more vehicles.

In another embodiment, a driver analysis system comprises a communication interface configured to receive vehicle operation data corresponding to operation of a one or more of vehicles operated by one or more drivers, a processing system configured to identify from one or more drivers a peer group associated with a target driver, process at least a portion of the vehicle operation data to determine driving performance of the target driver relative to driving performance of the peer group, and generate a driving score which generally identifies the driving performance of the target driver, wherein the processing system is further configured to generate an indication of circumvention of a safety interlock.

In another example embodiment, a driver analysis network, comprises a plurality of monitoring systems located on board a plurality of vehicles operated by a plurality of drivers wherein the plurality of monitoring systems is configured to transmit vehicle operation data corresponding to operation of the plurality of vehicles, a server configured to receive the vehicle operation data at a communication interface, identify from the plurality of drivers a peer group associated with a target driver, process at least a portion of the vehicle operation data to determine driving performance of the target driver relative to driving performance of the peer group, generate a driving report which identifies the driving performance of the target driver, and transmit the driving report at the communication interface, a target device configured to receive the driving report and display the driving report for viewing by the target driver or another entity, wherein the driving report comprises an indication of a condition of a safety device.

In another example embodiment, the monitoring systems which gather vehicle operation data are powered through an OBD port on each vehicle. The monitoring systems gather some of the vehicle operation data from the OBD port and gather other vehicle operation data from a source other than the OBD port. The monitoring systems may also include an accelerometer, GPS functionality, flash memory, a processor, a real-time operating system, as well as satellite, cellular and Bluetooth-type communication capabilities.

DETAILED DESCRIPTION

Figure 1:
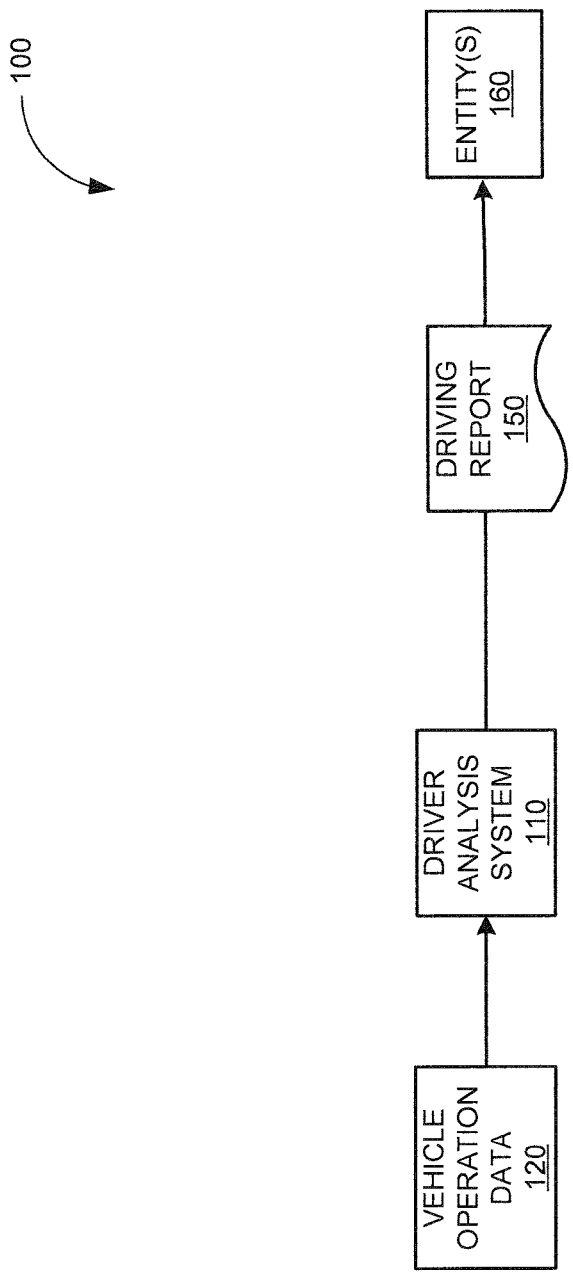
FIG. 1 illustrates an example driving report system.

FIGS. 1-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments and variations of the invention. As a result, the invention is not limited to the specific embodiments described below, but only by the claims and their equivalents.

The possibility of accidents is always a concern when operating a motor vehicle. Accidents can cause injuries, property damage, financial loss, and business disruption. Studies have shown that increased use of mobile phones, texting, and other electronic device use by drivers increases these risks. Business owners have a vested interest in making sure their drivers are exercising careful and responsible vehicle operation. Parents have similar concerns with respect to their children.

In addition to increasing the risks of accident or injury, aggressive or irresponsible driver behavior can have other adverse effects. Excessive acceleration and excessive speed can result in increased fuel costs, increased emission of pollutants, and premature vehicle wear. Similarly, frequent hard braking events may be an indicator that the vehicle is being operated in a manner which increases costs or the risk of accidents. In addition to causing premature wear, increased maintenance costs, and increased fuel costs, these behaviors may also lead to a shortened vehicle life and result in a need for premature replacement of the vehicle. Furthermore, disabling, circumventing, or otherwise not using safety systems may increase the risk of accident and injury.

For the reasons discussed above, it is desirable to gather vehicle operation data in order to monitor driver behavior as well as to formulate metrics which can be used to facilitate improvements. Because no driver is perfect and because circumstances will always require drivers to occasionally brake hard, accelerate quickly or engage in other similar driving behaviors, it may be desirable to perform a comparison to other drivers in similar circumstances to best identify realistic objectives and target areas for improvement. There are many variables which affect operational behavior like driver experience, vehicle type, driving environment, and geographical variations, as well as others. Therefore, driver behavior metrics are most meaningful and most fairly applied when a driver is compared to other peer drivers who are operating under the challenges of similar conditions.

One driving environment to account for may be rapid deceleration due to a yellow light at an intersection. The perception-reaction time may be about 1 second. A deceleration rate in the $85^{th}$ percentile may be about −6.7 mph/second. Some safety devices may indicate a hard braking event at −5.4 mph/sec. This may provide an alert which may be misleading in that the driver may be driving more safely by hard breaking to avoid entering an intersection while the traffic signal is yellow or red.

Therefore, a hard braking event may be disregarded if it is determined it is near, or stopping before, an intersection which includes a traffic signal. Traffic signal location and position information may be obtained from NAVTEQ road data. Location and status of traffic lights may be available from Google Maps, or other sources.

Therefore, if it is determined a traffic light present from the NAVTEQ road data and its location is available, then the safety score will account for such data when calculating Hard Braking Score.

Account should be as follows: If (1) location of the Hard Braking Event is within 50 yards [along the driving direction] distance from the Traffic Light Location AND (2) Hard Braking event [with Amplitude equal OR lower then ABS (−6.7) mph/sec], then do NOT include Hard Braking Event into the Hard Braking Score calculations when Analytics Data are calculated.

Rather than simply punish drivers who exceed certain pre-defined thresholds, it is beneficial to provide drivers ongoing information about their driving performance and how that driving performance compares to the performance of the driver's peers. This constructive feedback gives the driver sufficient information to manage his or her driving behaviors in a proactive manner and understand his or her performance relative to peers or other groups. It gives the driver an opportunity to make improvements and see the results of those improvements. Providing the information in a historical format allows drivers to track their improvements over time.

Since driving conditions vary, incremental improvement of every driving behavior metric during every time period may not be realistic and some undulation is expected. For this reason, it is desirable to also determine an overall driving score which summarizes the driver's overall performance for the time period in the form of a single performance score. By implementing a driver analysis system which provides this information directly to drivers and other entities in a concise and summarized graphical format, many drivers may be encouraged or motivated to make improvements and will have the information to track their progress without the involvement of or pressure from their management or the judicial system.

FIG. 1 illustrates driving report system 100, according to an embodiment. Driving report system 100 comprises driver analysis system 110 which receives vehicle operation data 120 from one or more vehicles. Driver analysis system 110 uses this data to generate driving report 150 which is delivered to entity (s) 160.

Vehicle operation data 120 may include information from the OBD port of the vehicle. This information may include engagement of the antilock braking system, as well as an indication of whether or not the seat belt is buckled. This information may be provided by a vehicle monitoring system electrically coupled to the vehicle. This includes receiving power from the OBD port and receiving information from the OBD port and/or the CAN bus of the vehicle.

Vehicle operation data also includes information from one or more devices not connected to the vehicle, such as a cell phone or other device. The other device may include GPS functionality, as well as an accelerometer and gyroscope capabilities. The information from the cell phone/other device may be used in conjunction with the other vehicle operation data to provide better, more, and more accurate information and observation of the driver behavior and vehicle operation.

The entity(s) 160 may include the target driver, and/or other person or entity, including a supervisor, safety person, etc. Report 150 may include various information as described below, including a safety score, and an indication of the status of a safety system. The indication may include a green or red color, indicating the status, as well as words or icon or other indication of what safety system for which the status is being indicated.

Safety systems may include the safety belt system. Drivers may buckle the seatbelt behind the seat, or in another position. This may prevent the safety belt indicator in the car from illuminating or making an annoying noise. However, this is unsafe.

Methods for determining if the safety belt is engaged, but not being used properly may include if the safety belt is engaged when the vehicle is stopped for an extended period of time. Vehicle movement may be determined via an accelerometer either from the vehicle monitor, cell phone or other device. Furthermore, vehicle motion may be determined from the GPS of the vehicle monitor, cell phone or other device. The engine being on may also be determined from information from the OBD port.

If the driver has exited the vehicle, which may be determined from the cell phone with the driver, and information from the in-vehicle monitor, and the safety belt is still engaged, this may be an indication that a safety system, namely the safety belt system has been circumvented, disabled, or is otherwise being operated improperly.

Figure 2:
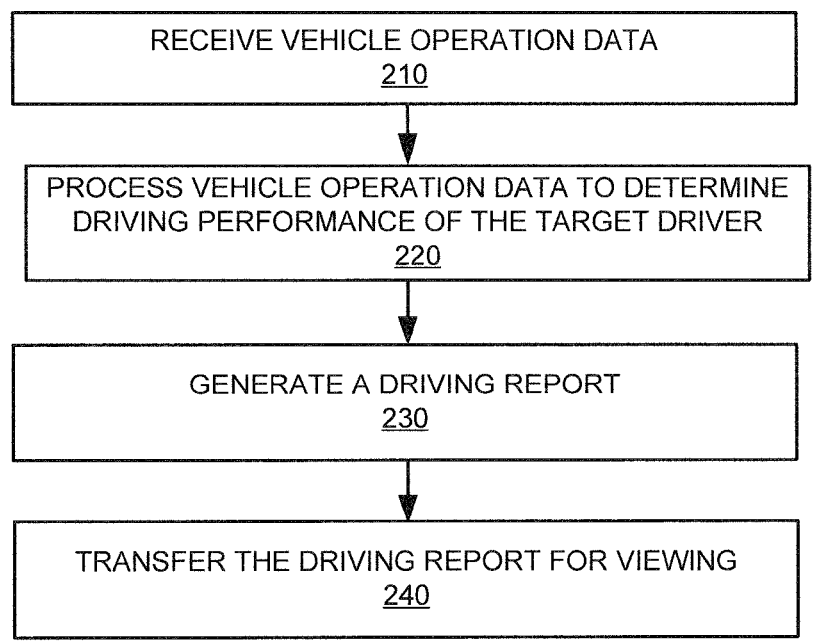
FIG. 2 illustrates the operation of a driving report system, according to an example.

FIG. 2 is a flow chart illustrating a method of operating driving report system 100. Driver analysis system 110 receives vehicle operation data 120 which is collected from multiple vehicles driven by different drivers (step 210). Driver analysis system 110 may optionally identify a peer group of drivers associated with the driver of interest, target driver 160. Next, driver analysis system 110 optionally processes the vehicle operation data to determine the driving performance of target driver 160 (step 220). The driving performance may include an individual driving score. The individual driving score may be based at least in part on whether or not a safety system of the vehicle has been bypassed, circumvented, disabled, etc. Although the example of a safety belt system is described, vehicle operation data may be used to determine if other safety or other system of the vehicle has been bypassed, disabled, tampered with, etc.

The driving performance may also be based on a comparison to the peer group. Based at least in part on the results of this comparison, driver analysis system 110 generates driving report 150 (step 230) which identifies the driving performance of the target driver and transfers driving report 150 to a target device for viewing by entity(s) 160 (step 240). The report includes the driver's performance in at least one category and indicates how that performance compares to that of the peer group, as well as an overall driving score.

The score may be log normalized such that the score appears to be "above average." This may increase the driver's confidence in the system because most drivers think they are an above average driver. This may increase the likelihood that the driver will improve their driving habits.

Figure 3:
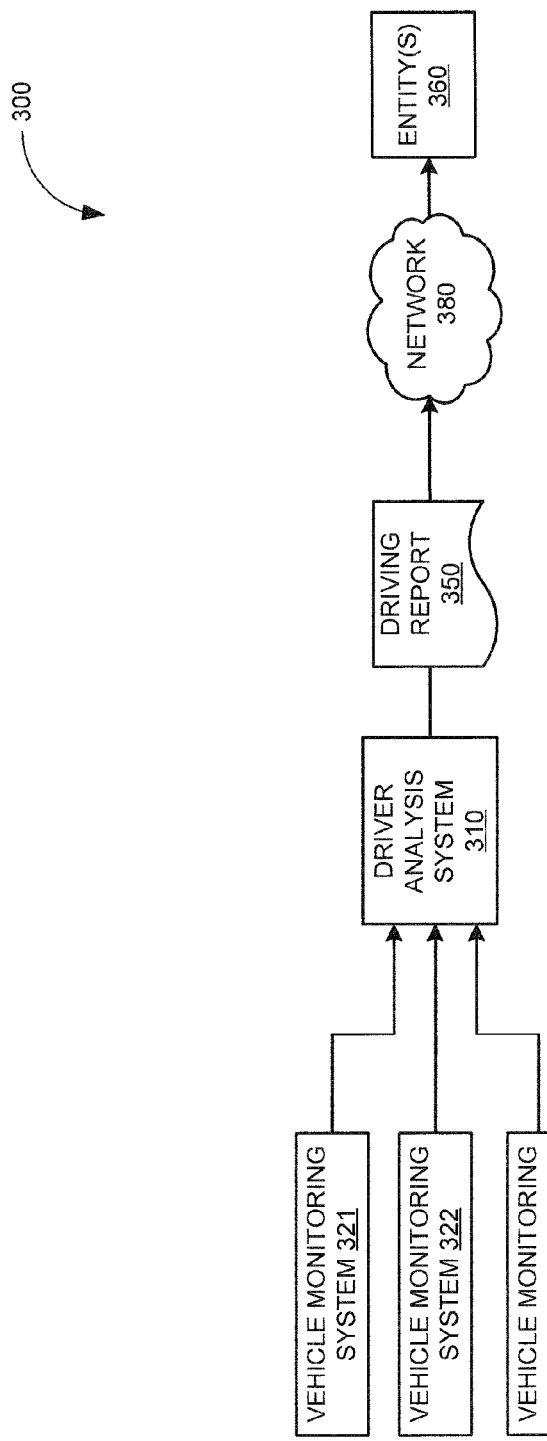
FIG. 3 illustrates a driving report system, according to an example.

FIG. 3 illustrates driving report system 300. Driving report system 300 comprises a driver analysis system 310 which receives vehicle operation data from vehicle monitoring systems 321-323 and uses this data to generate a driving report 350 which is delivered to one or more entities 360, such as the target driver and an entity in the justice or, penal, and/or law enforcement systems.

In FIG. 3, driver analysis system 310 receives vehicle operation data from vehicle monitoring systems 321-323. Vehicle monitoring systems 321-323 are electronic devices which are on board each individual vehicle and collect data about the operation of the vehicle over a period of time. The data includes information about how the vehicle is being used and the driver's operational behavior characteristics.

Vehicle monitoring systems 321-323 may be electrically and communicationally coupled to a vehicle. Vehicle monitoring systems 321-323 may receive information and power from the OBD port of the vehicle. Vehicle monitoring systems 321-323 may include an accelerometer, GPS functionality, flash memory, a processor, a real-time operating system, satellite communication capabilities, cellular communication capabilities, and Bluetooth-type communication capabilities Periodically, each of the vehicle monitoring systems 321-323 transfers this data to driver analysis system 310. The vehicle operation data may include data describing acceleration, speed, braking, lateral acceleration, fuel consumption, emissions, location, driving hours, maintenance, safety system status, as well as potentially many other types of vehicle diagnostics and information about how the vehicle is being operated, including information from other devices and cell phones located adjacent the vehicle.

Upon receipt of the vehicle operation data from one or more vehicles via associated vehicle monitoring systems 321-323, driver analysis system 310 generates a driving report for a particular driver, target driver. In order to analyze the operation data and provide meaningful and valid comparisons for target driver or other and/or other entities 360, driver analysis system 310 may or may not identify a "peer" group of drivers associated with target driver. This "peer" group may be determined based on selecting other drivers who drive similar types of vehicles, have similar driving assignments, have similar levels of experience, drive in similar geographic areas, or other factors which suggest useful comparisons.

Driver analysis system 310 may then process the vehicle operation data to determine driving performance of target driver 360 relative to driving performance of the selected peer group based upon the various types of operation data gathered, or based on the individual driver and vehicle operation data. One example is hard braking events. Through the course of operation, vehicle monitoring systems 321-323 gather data each time the braking force applied to a vehicle exceeds a threshold. These thresholds may be set quite low so as to capture events that are minor in nature. Relatively insignificant events may be useful in characterizing patterns of behavior. While these minor events will happen occasionally with all drivers because unexpected situations do occur, a higher rate of these events may suggest excessive speed, following other vehicles closely, distracted driving, or other undesirable behaviors.

In this example, driver analysis system 310 determines the rate of occurrence of hard braking events for all drivers in the peer driver group. For example, this may be determined as a rate—an average number of hard braking events for each hour of driving. Alternatively, it may be determined as an absolute figure for a fixed time period—a number of hard braking events per week. Driver analysis system 310 then determines the rate of occurrence for target driver 360 in the same manner. The performance of target driver 360 is compared to the average for the peer group and may also be compared to other characteristics of the peer group including, but not limited to, minimum, maximum, best, and worst. Those skilled in the art will recognize there are many other operational and behavioral parameters which may be analyzed and many types of statistical analysis which may be performed on the data. The invention is not limited to the specific examples provided above.

Based on the results of the analysis, driver analysis system 310 generates driving report 350 which identifies the driving performance of the target driver and includes a comparison to the peer group. Driver analysis system 310 transfers driving report 350 to a target device for viewing by one or more entities. The entities may include the target driver 360 and other entities. The entities 360 receive the driving report 350 possibly over internet or other communication system 380 and view it on a target device.

The target device may include a paper report, a personal computer, mobile phone, mobile internet terminal, or other type of electronic communication device. Driving report 350 may be transmitted in the form of regular mail, an email, text message, or displayed on a web page. Driving report 350 may also be incorporated into a software document, such as a MS Word file, a PDF file, a Power Point file, or the like. In yet another example, the analysis may be provided in a video format and played-out to the user. An audio presentation of the analysis may also be possible, such as by way of a voicemail message, a phone recording, or the like.

Figure 4:
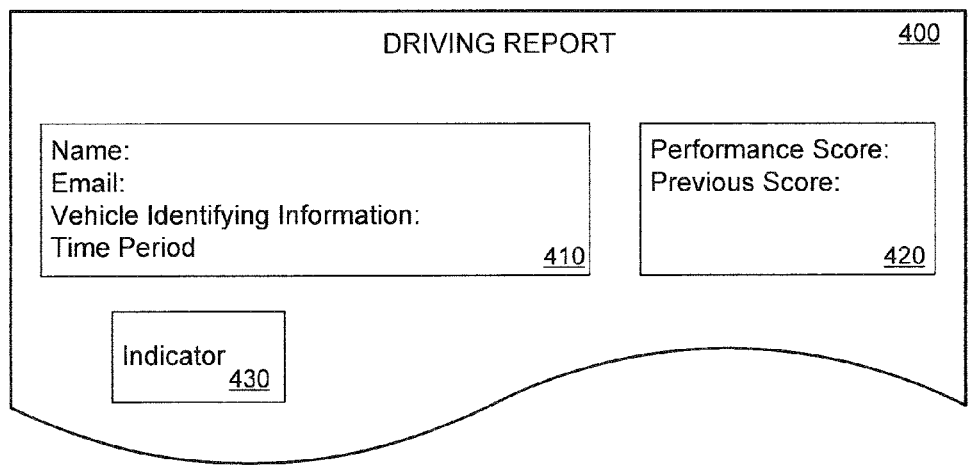
FIG. 4 illustrates an example driving report.

FIG. 4 illustrates an example driving report. In information block 410, driving report 400 includes information identifying the driver, the driver's email address, the vehicle driven, and the time period to which the report applies. Additional information may be included to identify the vehicle including make, model, license plate number, or other identifying information. Block 420 includes the driver's safety or performance score for the current period as well as the previous safety or performance score. This score is a combined score which represents an overall score based on the various individual categories of operation characteristics, if more than one, which are reported and considered. Driving report 400 may also include multiple previous performance scores enabling the driver to easily see the performance trend over time relative to other drivers.

In this example, driving report 400 includes one or more indicators 430. Indicators 430 may indicate status of a safety system, such as a safety belt system. Indicators 430 may be capable of indicating if a safety system has been tampered with, bypassed, etc. The determination of tampering, etc. may be based on vehicle operation data from various sources.

Figure 5:
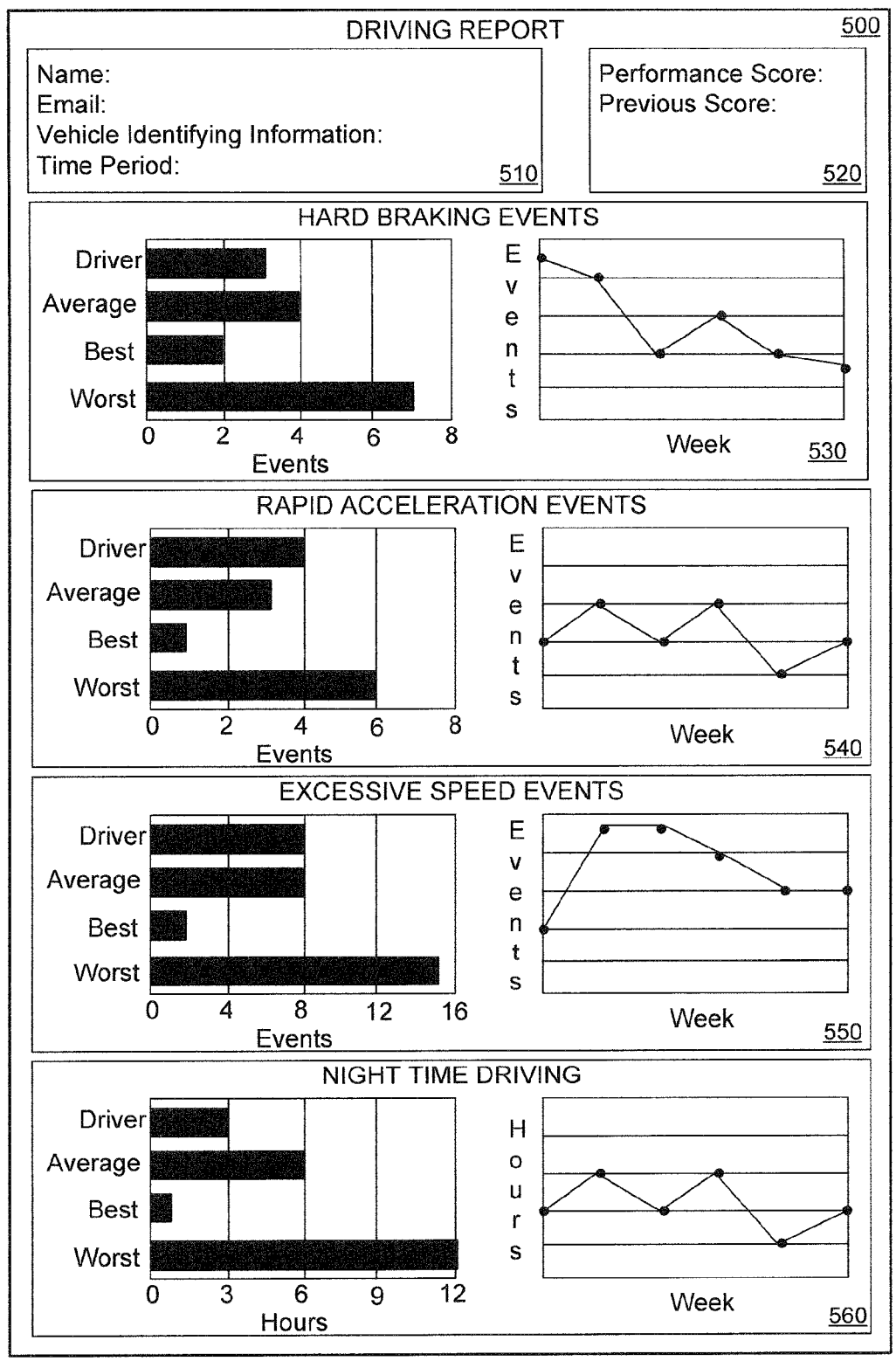
FIG. 5 illustrates a driving report, according to an example.

FIG. 5 illustrates an example of a driving report, according to an example. In information block 510, driving report 500 includes information identifying the driver, the driver's email address, the vehicle driven, and the time period to which the report applies. Additional information may be included to identify the vehicle including make, model, license plate number, or other identifying information. If the driver drove multiple vehicles during the time period, each vehicle could be listed and the consolidated information could be included on driving report 500.

Block 520 of driving report 500 includes the driver's performance score for the current period as well as the previous performance score. The performance score is a combined score which represents an overall score based on the various individual categories of specific behaviors which are reported and considered. Driving report 500 may also include multiple previous performance scores such that the driver can easily see the performance trend over time relative to other drivers.

In addition, driving report 500 includes detailed reporting information on specific operational characteristics in blocks 530-560. Block 530 includes information on hard braking events for the target driver. The number of hard braking events the target driver had in the reporting period is compared to the average for the peer group as well as to the drivers in the peer group who had the best and worst performance for the time period as measured by number of events. Rather than absolute quantity, the comparison could be based on a rate such as hard breaking events per hour, per week, or per hundred miles driven. Block 520 also includes a historical graphical representation illustrating the driver's hard braking event performance trend over time. Blocks 540, 550, and 560 provide similar illustrations of reporting information for rapid acceleration events, excessive speed events, and number of night time driving hours.

Those skilled in the art will recognize there are many other operational and behavioral parameters which may be analyzed and included in driving report 500. There are also many types of statistical analysis which may be performed on the data. The resulting driving information may be graphically presented and displayed in many different ways. The invention is not limited to the specific examples and methods of presentation provided in FIG. 5.

In addition to periodic driver reports, immediate alerts may be generated and provided as well. For example, if a number of hard braking events are detected beyond a threshold, the user may be provided with an alert describing this driving behavior. Such an immediate alert may result in a reduction in hard braking events, thereby increasing safety. The alerts may be provided in real-time, but may also be provided some time later after the events are detected. Status of safety systems may also be immediately alerted.

Figure 6:
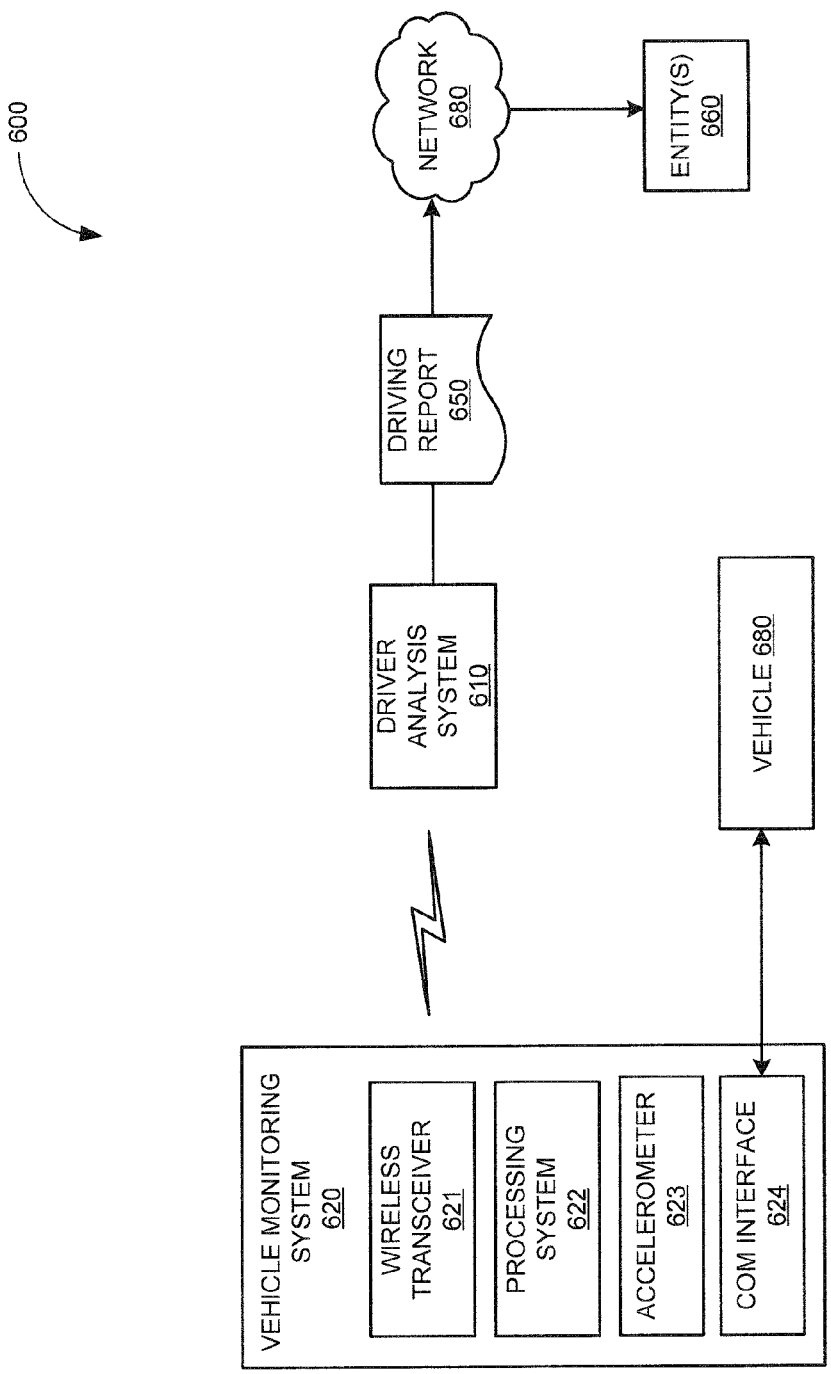
FIG. 6 illustrates an example driving report system.

FIG. 6 illustrates driving report system 600. Driving report system 600 comprises a driver analysis system which receives vehicle operation data from vehicle monitoring system and other devices through a wireless connection and uses this data to generate a driving report which is delivered to a target driver over the internet.

In the example in FIG. 6, driver analysis system 610 receives vehicle operation data from multiple vehicle monitoring system similar to that illustrated by vehicle monitoring system 620. Vehicle monitoring system 620 is an electronic device which is generally adjacent or coupled to vehicle 680 and collects data regarding the operation of the vehicle 680 over a period of time. Vehicle monitoring system 620 interfaces to and collects data from vehicle 680 through a connection between On Board Diagnostic (OBD) interface 624 and OBD port 681. The OBD port is a standardized interface which allows vehicle monitoring system 620 to capture many different types of data from vehicle 680's electronic and engine management systems. Vehicle monitoring system 620 could also use and transmit information from a smartphone of an occupant of the vehicle, or from a GPS system associated with the vehicle, among other sources of data.

In addition to the operational data gathered through OBD port 681, vehicle monitoring system 620 gathers operational data from other sources as well. In one example, vehicle monitoring system 620 contains accelerometer 620 which is used to keep track of the location and speed of vehicle 680. This location and speed information may also be combined with the other operational data gathered. Vehicle monitoring system 620 may gather location and speed information from other devices such as a global position system (GPS) receiver. In addition, vehicle monitoring system 620 may collect vehicle operation data from other sensors or sources which are neither part of vehicle monitoring system 620 nor vehicle 680, such as a personal communication device, such as a smartphone.

Vehicle monitoring system 620 could also include a global positioning system (GPS) receiver, to receive and interpret signals from positioning satellites to determine geographic coordinates. In an example, vehicle monitor 620 includes an accelerometer, GPS functionality, gyroscope, flash memory, a processor, a real-time operating system, as well as cellular, satellite, and Bluetooth-type communication capabilities.

Processing system 622 in vehicle monitoring system 620 receives, processes, and stores all of the gathered vehicle operation data such that it can be transmitted at the appropriate time. Vehicle monitoring system 620 uses wireless transceiver 621 to transmit the set of vehicle operation data to driver analysis system 610. This process may be performed frequently or may be performed only once each reporting period. The transmission may be initiated by either vehicle monitoring system 620 or by driver analysis system 610. The vehicle operation data may include data describing acceleration, speed, braking, fuel consumption, location, driving hours, maintenance, status of safety systems, as well as potentially many other measures of driver behavior, vehicle operation data, and vehicle diagnostics.

After driver analysis system 610 receives data for multiple drivers or vehicles, it begins the process of generating a driving report for a particular driver, target driver/other entity 660. In order to analyze the operation data and provide meaningful and valid comparisons for target driver 660, driver analysis system 610 may identify a peer group of drivers associated with target driver 660. This peer group may be determined based on selecting other drivers who drive similar types of vehicles, have similar driving assignments, similar levels of experience, drive in similar geographic areas, or other factors which suggest useful comparisons. If a company wants to perform a broader benchmark comparison of its drivers to the drivers of other entities, the data may also be shared such that a peer group includes drivers which are employed by those other entities.

Next, driver analysis system 610 processes the vehicle operation data to determine driving performance of target driver 660 relative to driving performance of the selected peer group based upon various types of operation data gathered. Alternatively, an individual assessment may be made. One example is rapid acceleration events. Through the course of operation, vehicle monitoring system 620 and/or other devices gather data each time the vehicle accelerates at a rate which exceeds an expected or predetermined threshold. This acceleration information may be gathered from the electronic systems of the vehicle as reported through OBD port 681 or may be gathered from accelerometer 623, or from another device. While all drivers may have an occasional, legitimate need to accelerate rapidly, a higher rate of these events may suggest aggressive driving, excessive speed, or other undesirable driver behaviors.

In this example, driver analysis system 610 determines the rate of occurrence of rapid acceleration events for all drivers in the peer driver group. For instance, this may be determined as a rate or an average number of rapid acceleration events per time period of driving. Alternatively, it may be determined as an absolute figure for a fixed time period, the number of rapid acceleration events per week. Driver analysis system 610 then determines the occurrence of rapid acceleration events for target driver in the same manner. The performance of target driver is compared to the average for the peer group. Target driver's performance may also be compared to other characteristics of the peer group including, but not limited to, minimum, maximum, best, and worst. Those skilled in the art will recognize there are many other operational and behavioral parameters which may be analyzed and many types of statistical analysis which may be performed on the data. The invention is not limited to the specific examples provided above.

Based on the results of the analysis, driver analysis system 610 generates driving report 650 which identifies the driving performance of the target driver and comparisons to the peer group. Driver analysis system 610 transfers driving report 650 to one or more entities for viewing by sending it over network 680 or other means. Target driver 660 and other entities receive driving report 650 over network 680 through a target device and view the report on that device.

The target device may be paper, a personal computer, mobile phone, mobile internet terminal, or other type of electronic communication device. Driving report 650 may be transmitted in the form of mail, email, text message, or displayed on a web page. Driving report 650 may also be incorporated into a software document, such as a MS Word file, a PDF file, a Power Point file, or the like. In yet another example, the analysis may be provided in a video format and played-out to the user. An audio presentation of the analysis may also be possible, such as by way of a voicemail message, a phone recording, or the like.

Figure 7:
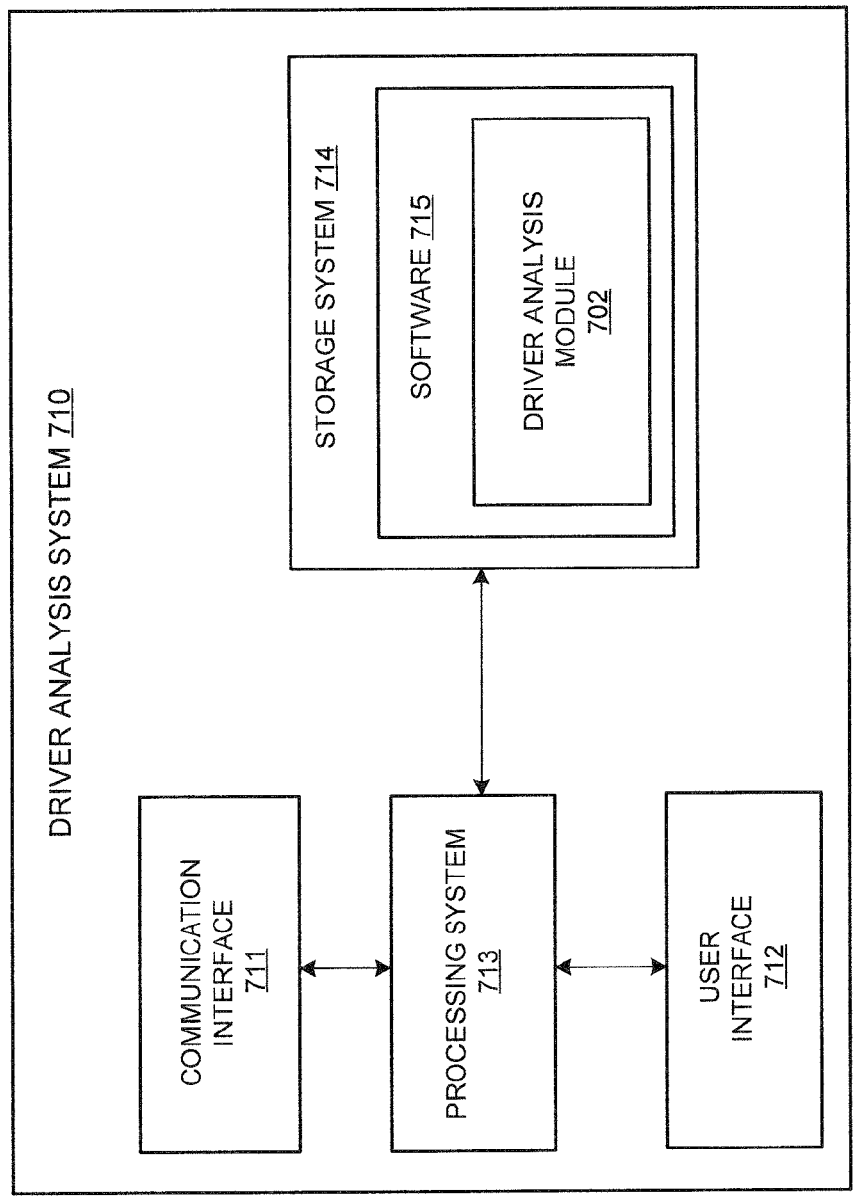
FIG. 7 illustrates a driving report system, according to an example.

FIG. 7 illustrates driver analysis system 710 which is exemplary of the driver analysis systems in previous figures. Driver analysis system 710 is capable of receiving and processing vehicle performance data for a vehicle driven by a user. Driver analysis system 710 processes the performance data to generate an analysis of the driving behavior of the user. Driver analysis system 710 then provides a driving report one or more entities.

Driver analysis system 710 includes communication interface 711, user interface 712, processing system 713, storage system 714, and software 715. Software 715 includes driver analysis module 702. Processing system 713 is linked to communication interface 711 and 712. Software 715 is stored on storage system 714. In operation, processing system 713 executes software 715, including driver analysis module 702, to operate as described herein.

Communication interface 711 comprises a network card, network interface, port, or interface circuitry that allows storage system 714 to obtain vehicle performance data. Communication interface 711 may also include a memory device, software, processing circuitry, or some other communication device.

User interface 712 comprises components that interact with a user to receive user inputs and to present media and/or information. User interface 712 may include a speaker, microphone, buttons, lights, display screen, mouse, keyboard, or some other user input/output apparatus—including combinations thereof. User interface 712 may be omitted in some examples.

Processing system 713 may comprise a microprocessor and other circuitry that retrieves and executes software 715, including driver analysis module 702, from storage system 714. Storage system 714 comprises a disk drive, flash drive, data storage circuitry, or some other memory apparatus. Processing system 713 is typically mounted on a circuit board that may also contain storage system 714 and portions of communication interface 711 and user interface 712.

Software 715 comprises computer programs, firmware, or some other form of machine-readable processing instructions. Software 715 may include an operating system, utilities, drivers, network interfaces, applications, virtual machines, or some other type of software, such as driver analysis module 702. When executed by processing system 713, software 715 directs processing system 713 to operate as described herein.

In operation, driver analysis module 702, when executed by processing system 700, operates as follows. Driver analysis module 702 directs computer system 700 to obtain vehicle performance data for a vehicle driven by a user. For instance, via communication interface 711, computer system 700 may communicate with a system capable of providing vehicle performance data. It should be understood that computer system 700 may communicate remotely or directly with such an interface.

In another example, communication interface 711 may merely gather positioning and time information from a positioning system on-board a vehicle. A vehicle may contain a GPS unit capable of determining the vehicle's location, and/or other information from a smartphone. This location information can be communicated to communication interface 711. Using the position and time information gathered by communication interface 711, processing system 713 is able to derive performance information related to the performance and operation of the vehicle.

It should be understood that the analysis may be provided directly to the user by way of user interface 712, such as by displaying the analysis on a display screen. However, it should also be understood that the analysis may be provided, by way of communication interface 711, to a user device capable of presenting the analysis to the user.

Driver analysis system 710 may also be capable of indicating status of a safety system. The safety system may be a safety belt system, and the indication may be that the system is functioning normally, it has been tampered with, it is being bypassed, etc.

Figure 8:
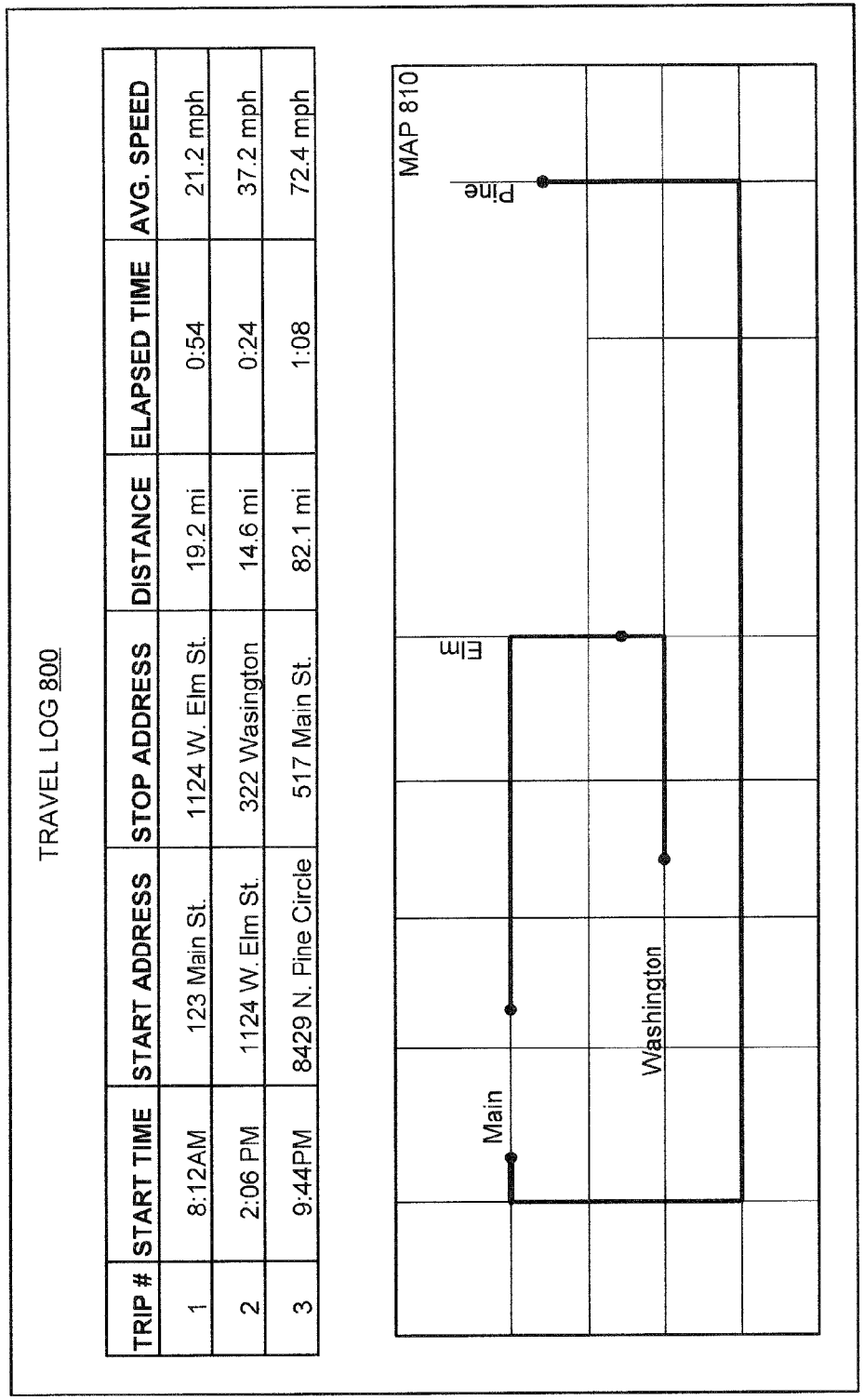
FIG. 8 illustrates an example travel log portion of a driving report.

FIG. 8 illustrates travel log 800 which may be included in a driving report. Travel log 800 includes a detailed listing of trips made using the vehicle during the reporting period. The listing includes start time, start address, stop address, distance, elapsed time, and average speed for each trip. Other information describing the nature of each trip and the operational characteristics of the vehicle during that trip is also possible. Travel log 800 also includes map 810 which visually illustrates the route of each trip or trip segment on a map.

It should be understood that many advantages are provided by the systems and methods disclosed herein for analyzing driver performance and providing a presentation of the performance. Driver behavior can be altered via a feedback loop that does not distract the driver. This may be referred to as delayed feedback. While some past systems record incident behavior—such as at the moment of a crash—the disclosed systems and methods analyze behavior so as to reduce the occurrence of such incidents in the future. It can be shown that driving habits and behavior directly correlate to and are predictive of risk of collision or crash.

Other patterns of behavior relate to inefficient fuel consumption, route determination, and excessive emissions. Thus, the disclosed systems and methods can reduce the occurrence of accidents, improve environmental factors, and reduce costs.

After extensive study of a large volume of drivers and reported events of various types, it has been determined that many aspects of driver behavior exhibit a 'log-normal' distribution. A log-normal distribution is a probability distribution of a random variable whose logarithm is normally distributed. Strategies for comparing and ranking drivers must take this into account. Linear normalization, histograms, and bell curves will not reveal critical differences in driver performance.

Log-normal distribution may increase the driver's confidence in the system in that it will show most drivers as "above average." Since most drivers consider themselves above average, it will reinforce that belief, and the driver's confidence in the report and system.

A driver analysis module, such as module 702 described above, may produce a scorecard that may provide three different perspectives on the behavior of a specific driver:
 log normal ranking of each driver against a population of other drivers for a given time interval for each metric gathered by the vehicle monitoring system,
 a trend of the absolute number of events for each metric over an extended period of time,
 an overall numeric score which weights various log normal ranking of metrics In one embodiment, the formula used for calculating a Combined Weighted Score is as follows.
 Combined Weighted Score [CWS] is a mathematical calculation for a specific individual over a specific period of time compared with a specific peer group known as a SCOPE.
 Each measured attribute (Hard Brakes, Rapid Starts, Overspeed, etc.) has an individual score [IS] associated with it for a given period of time related to a specific SCOPE.
 Each IS has a weighted value [ISW] as it relates to that specific SCOPE. Different SCOPES may have different ISW values.
 This allows each and any SCOPE to have its own subset of the Individual Scores and associated weighting in determining the Combined Weighted Score calculations.

DEFINITIONS

CWS.Scope(i)—Combined Weighted Score for all Individual Scores (i.e. attributes) participating in the calculations in the Scope(i)
CWS.Scope(i).Min=60 (Minimum score possible)
CWS.Scope(i).Max=100 (Maximum score possible)
IS (i,j)—Individual Score (j) for the Attribute(j) in the Scope(i)
ISW(i,j)—Individual Score Weight(j) for the Attribute(j) in the Scope(i). Units of measure: %
For each and any Scope(i) the following is always true:
SUM (ISW(i,j))=100%, where: j=1, m(i) AND m(i) is number of the Individual Scores participating in the Scope(i)
Combined Weighted Score Calculation $$CWS.Scope(i) = CWS.Scope(i).Min + (CWS.Scope(i).Max - CWS.Scope(i).Min) * (ISW(i,1)*IS(i,1) + ISW(i,2)*IS(i,2) + \ldots + ISW(i,m(i))*IS(i,m(i)))$$
$$= CWS.Scope(i).Min + (CWS.Scope(i).Max - CWS.Scope(i).Min) * SUM(ISW(i,j)*IS(i,j))$$

Where: j=[1, m(i)] AND m(i) is number of the Individual Scores participating in the Scope(i).

Implementation:

In create/edit scope UI, there is a table with 2 columns.

1st column: Name of the attribute available in the scope

2nd column: Individual Score Weight (ISW(i,j))

The SUM (ISW(i,j))=100% has to be enforced

Default behavior:

Hard Brakes=25%

Rapid Starts=25%

Speeding=25%

Night Driving=0%

Idling=25%

Average MPG=0%

Hard Driving=0%

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a driver analysis system, the method comprising:
    receiving vehicle operation data corresponding to operation of one or more vehicles operated by one or more drivers by the driver analysis system;
    receiving traffic light location information;
    generating a driving report which identifies the driving performance of a target driver based at least in part on the vehicle operation data and the traffic light location information, wherein at least a portion of the vehicle operation information is disregarded based at least in part on the traffic light location information; and
    transferring the driving report to a target device for viewing by one or more entities.

2. The method of claim 1, wherein the driving report comprises a safety score generally representing a level of safety of the driving performance of the target driver.

3. The method of claim 1, wherein the vehicle operation data is received at a communication interface in the driver analysis system from one or more monitoring systems located generally adjacent the one or more vehicles.

4. The method of claim 3, wherein the one or more monitoring systems is powered from an On Board Diagnostic (OBD) port on the one or more vehicles.

5. The method of claim 3, wherein the one or more monitoring systems further comprises at least one of an accelerometer, GPS functionality, flash memory, a processor, a real-time operating system, satellite communication capabilities, cellular communication capabilities, and Bluetooth-type communication capabilities.

6. The method of claim 1, wherein at least a portion of the vehicle operation data is gathered from a source other than from the OBD port of the one or more vehicles.

7. The method of claim 2, wherein the driving score of the target driver is compared to at least one other driving score of one or more other drivers.

8. The method of claim 7, wherein the performance of the target driver is compared to a best, worst, and average of the one or more other drivers.

9. The method of claim 1, wherein the driving score is based at least in part on driving attributes of the vehicle operation data.

10. The method of claim 9, wherein the driving attributes comprise an indication of a hard braking event.

11. The method of claim 10, wherein one or more of the hard braking events is disregarded if it is determined it occurred near a traffic signal.

12. A driver analysis system comprising:
    a communication interface configured to receive vehicle operation data, from a monitoring system adjacent one or more vehicles, corresponding to operation of the one or more of vehicles operated by one or more drivers;
    a processing system configured to identify from one or more drivers a peer group associated with a target driver, process at least a portion of the vehicle operation data to determine driving performance of the target driver relative to driving performance of the peer group, and generate a driving score which generally identifies the driving performance of the target driver;
    wherein at least a portion of the vehicle operation data is disregarded based at least in part on traffic light location information.

13. The driver analysis system of claim 12, wherein the driving report comprises a safety score generally representing a level of safety of the driving performance of the target driver.

14. The driver analysis system of claim 13, wherein the driving score is based at least in part on driving attributes of the vehicle operation data.

15. The method of claim 14, wherein the driving attributes comprise an indication of hard braking events, and wherein one or more of the hard braking events is disregarded if it is determined it occurred near a traffic signal.

16. The driver analysis system of claim 12, wherein the monitoring system(s) comprise at least one of an accelerometer, GPS functionality, flash memory, a processor, a real-time operating system, satellite communication capabilities, cellular communication capabilities, and Bluetooth-type communication capabilities.

17. The driver analysis system of claim 12, wherein the driving score of the target driver is compared to a best, worst, and average of the peer group.

18. A driver analysis network, comprising:
    a plurality of monitoring systems located on board a plurality of vehicles operated by a plurality of drivers wherein the plurality of monitoring systems is configured to transmit vehicle operation data corresponding to operation of the plurality of vehicles;
    a server configured to receive the vehicle operation data at a communication interface, identify from the plurality of drivers a peer group associated with a target driver, process at least a portion of the vehicle operation data to determine driving performance of the target driver relative to driving performance of the peer group, generate a driving report which identifies the driving performance of the target driver, and transmit the driving report at the communication interface;
    a target device configured to receive the driving report and display the driving report for viewing by the target driver or another entity, wherein the driving report comprises an indication of hard braking events, and wherein one or more of the hard braking events is disregarded if it is determined it occurred near a traffic signal.

19. The driver analysis system of claim 18, wherein the server is further configured to receive traffic light location information.

\* \* \* \* \*